United States Patent [19]

Sakamoto et al.

[11] 4,210,023
[45] Jul. 1, 1980

[54] METHOD AND APPARATUS FOR MEASURING SLAG FOAMING USING MICROWAVE LEVER METER

[75] Inventors: Yoshiyasu Sakamoto, Kaizuka; Sumio Kobayashi, Yamato Kohriyama; Akio Hatono, Nishinomiya, all of Japan

[73] Assignee: Sumitomo Metal Industries, Ltd., Osaka, Japan

[21] Appl. No.: 886,573

[22] Filed: Mar. 14, 1978

[30] Foreign Application Priority Data

Mar. 25, 1977 [JP] Japan .................... 52/32835

[51] Int. Cl.$^2$ ............................. G01F 23/00
[52] U.S. Cl. .................... 73/290 R; 343/14; 343/17.7
[58] Field of Search ............... 73/290 R; 324/58.5 B; 343/12 R, 14, 17.7

[56] References Cited

U.S. PATENT DOCUMENTS

| 4,044,353 | 8/1977 | Levy ........................... 343/14 |
| 4,044,354 | 8/1977 | Bosher et al. ................. 343/14 |
| 4,044,355 | 8/1977 | Edvardsson ................... 343/14 |

FOREIGN PATENT DOCUMENTS

51-115217 of 1976 Japan ......................... 343/14

OTHER PUBLICATIONS

Measurement of Slag Foaming in Converter by Measuring Sound, Steel, No. 159, 1966, p. 36.
Measurement of Slag Foaming in Converter by Measuring Sound, Journal of Metals, No. 18, 1966, Apr., pp. 485-490.
Measurement of Slag Foaming in Converter by Measuring Sound, Paper presented at 1973 BOT.

*Primary Examiner*—Donald O. Woodiel
*Attorney, Agent, or Firm*—Wenderoth, Lind & Ponack

[57] ABSTRACT

A method for continuously measuring slag foaming within a converter during blowing and an apparatus for practising the method are disclosed.

In this method, the foaming slag level is determined by detecting and processing a beat signal developed between the frequency-modulated transmitted wave and the reflected wave of a microwave radar. The apparatus for practising this method comprises a microwave generator, an antenna and a waveguide, and signal processing circuitry. The microwave generator generates frequency-modulated microwaves and supplies them to the antenna which is provided with a waveguide for directing these microwaves into the converter. The antenna with the waveguide are provided with water-cooling means and air purge means to overcome the heat, dust and splash from the converter. The signal processor determines the foaming slag level by detecting and processing the beat signal between the microwaves reflected from the slag within the converter and the reflected waves from a reference reflector added to the antenna.

18 Claims, 5 Drawing Figures

METHOD AND APPARATUS FOR MEASURING SLAG FOAMING USING MICROWAVE LEVER METER

BACKGROUND OF THE INVENTION

The present invention relates to a method and an apparatus for measuring a slag foaming level and, particularly, to a method and an apparatus for continuously measuring the slag foaming level within a converter during a blowing operation.

Slag foaming within the converter is caused during the blowing step of a steel making operation by CO bubbles accompanied by gas generation due to the specific blowing condition and/or slag contents. The slag foaming adversely affects the converter operation by causing sharp variations in the slag level and by causing occasionally sloppings.

Therefore, quantitative determination and control of slag foaming has been long desired. If continuous and quantitative determination of the slag foaming level during converter blowing is made possible, it will be possible to prevent the sloppings during the blowing operation by regulating the blowing condition in relation to the quantitatively measured slag foaming condition thereby improving the control of the entire converter operation.

The slag foaming condition in the converter has been determined heretofore by by visual observation of this condition at a time when the converter was tilted or by occasional measurements of the change in electric resistance using a sub-lance probe. However, it is impossible to continuously and quantitatively determine the slag foaming condition by these methods.

Accordingly, an object of the present invention is to provide a relatively simple method for continuously and quantitatively measuring the slag foaming level during converter blowing operation.

Another object of the present invention is to provide an apparatus for practising this method.

SUMMARY OF THE INVENTION

The slag foaming measuring method according to the present invention is characterized in that an antenna and a waveguide are provided above the top of the converter, a microwave generator and signal processing circuitry are provided in electrical connection to this antenna and waveguide. Frequency-modulated microwaves are emitted from the microwave generator into the converter, and the beat signal between these emitted waves and the waves reflected from the slag surface is detected and applied to the signal processing circuitry in which the foaming slag level in the converter during the blowing is determined. This characteristic is realized by mixing the frequency-modulated microwaves having a saw-tooth or a triangular waveform reflected from the slag surfacewith the waves reflected from a reference reflector provided at the antenna and by processing as described hereinunder the beat signal generated by these signals.

The apparatus for practising the method according to the present invention has provision for the antenna and the waveguide include water-cooling protective means and air purge means, for the microwave generator to generate frequency-modulated microwaves, and for the signal processor to process the reflected waves.

BRIEF DESCRIPTION OF THE DRAWINGS

The invention will be better understood from the following description taken in connection with the accompanying drawings in which.

DESCRIPTION OF THE PREFERRED EMBODIMENT

In the present invention, an antenna and a waveguide including a water-cooled protective pipe are provided above the top of a converter, frequency-modulated microwaves having a saw-tooth waveform are emitted into the converter, the beat signal between the emitted waves and the waves reflected from the slag surface is detected, and a voltage value proportional to the distance between the slag surface and the antenna is thereby obtained using a frequency filter, an amplifying circuit, a waveform shaping circuit, and a counter circuit, thereby determining the real slag foaming condition. The relation of the beat frequency $f_b$ to the distance between the antenna and the slag surface is expressed by the following equation:

$$f = 2R/C \times \dot{f}_o \ldots \quad (1)$$

wherein:
$\dot{f}_o$ is the rate of frequency of the transmitted wave
C is velocity of the electromagnetic wave
R is distance between the antenna and the slag surface
The equation (1) is solved for R as follows:

$$R = f_b \cdot C / 2\dot{f}_o \ldots \quad (2)$$

Assuming in the equation (2) that $\dot{f}_o$ is constant, the value $C/2\dot{f}_o$ also becomes constant. Therefore, the value of R can be obtained by obtaining the value of $f_b$ by measurement and multiplying it by the constant $C/2\dot{f}_o$. Accordingly, the slag foaming measuring method according to the present invention can be practised through the following steps:

(a) generating frequency modulated microwaves with a predetermined frequency change rate ($\dot{f}_o$) having a saw-tooth waveform;

(b) emitting the generated microwaves toward the converter and the reference reflector;

(c) mixing the waves reflected from within the converter and from the reference reflector respectively, thereby producing a beat signal;

(d) detecting only the beat signal;

(e) determining the frequency of the detected beat signal; and (f) multiplying the determined frequency by the constant ($C/2f_o$), thereby obtaining the value of R.

The apparatus for practising the slag foaming measuring method according to the present invention will now be described with reference to the accompanying drawings.

Figure 1:
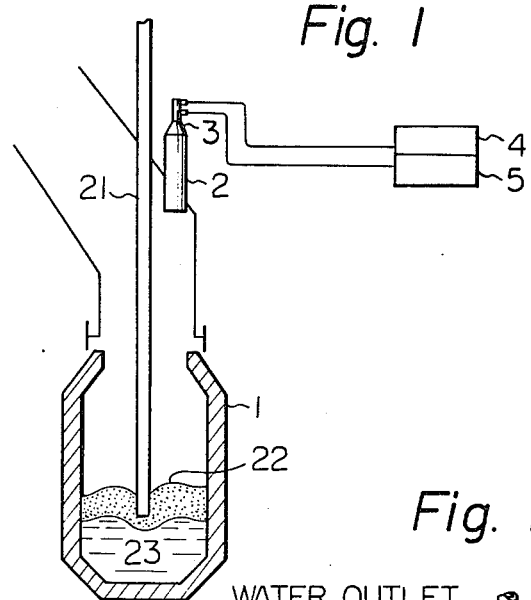
FIG. 1 is a shematic illustration of an embodiment of apparatus according to the present invention.

In FIG. 1 illustrating schematically an embodiment of the apparatus according to the present invention, the reference numeral 1 denotes a converter, reference numeral 2 denotes a water-cooled protective tube for preventing heat effects, reference numeral 3 denotes an antenna with a waveguide, reference numeral 4 denotes a microwave generator, and reference numeral 5 denotes signal processing circuitry for obtaining a voltage proportional to the distance from the beat signal. In addition, a lance is denoted by 21, the slag is denoted by 22 and the molten steel is denoted by 23.

The water-cooled protective pipe 2 is provided above the top of the converter 1, for directing the microwaves from the antenna 3 into the converter 1. The microwave generator 4 and the signal processing circuitry 5 are disposed at a position that is free from the influence of the converter and convenient for access and are connected through respective signal channels to the antenna 3.

Figure 2:
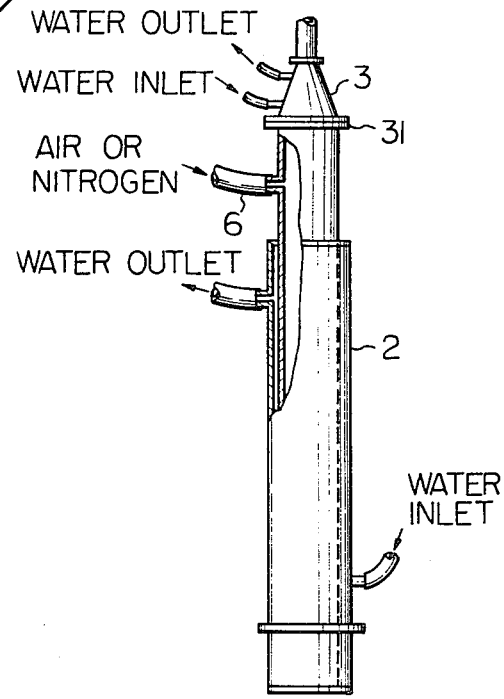
FIG. 2 is a side view of an antenna and a waveguide according to the present invention with the cooling protective pipe partially cut out.

As shown in FIG. 2, the water-cooled protective pipe 2 has a double wall structure and an air pipe 6 for air purging, and is connected to the antenna and waveguide 3 by its flange 31.

The antenna 3 is, as shown in FIG. 2, preferably provided directly with water-cooling means. Air, nitrogen and the like may be used as the gas for the air purge.

Figure 3:
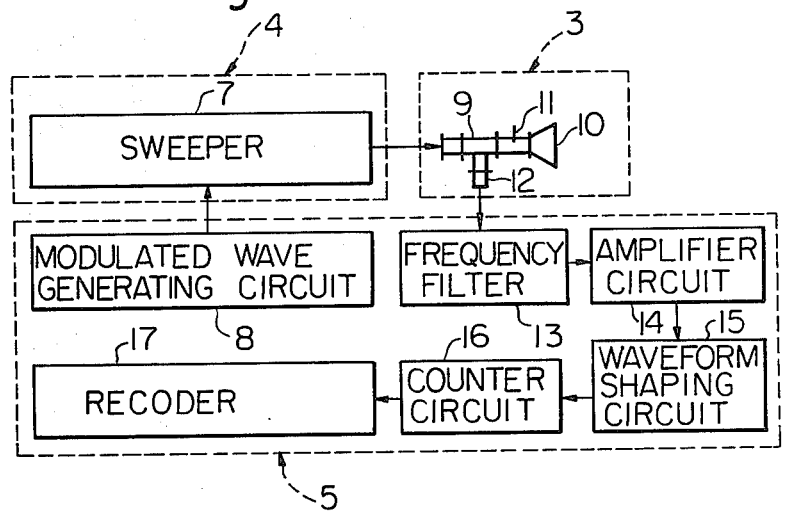
FIG. 3 is a block diagram of the antenna and the waveguide, the microwave generator and the signal processing circuitry in an embodiment of the apparatus according to the present invention.

FIG. 3 shows the detailed formation of the antenna and waveguide 3, the microwave generator 4, and the signal processing circuitry 5 and their interrelation. The antenna and waveguide 3 consist of a circulator 9, a horn 10, a reference reflector 11 and a detector 12. The microwave generator 4 consists of a sweeper 7 for generating microwaves. The signal processing circuitry 5 consists of a modulated wave generating circuit 8 for frequency modulation, a frequency filter 13 for analyzing the beat signal, an amplifier circuit 14, a waveform shaping circuit 15, a counter circuit 16 and a recorder 17.

The output of the modulated wave generating circuit 8 is connected to the sweeper 7, for frequency modulating the microwaves, and the output of the sweeper 7 is connected to the antenna 3 so that the microwaves are emitted into the converter 1 through the horn 10. The reflected waves from the slag surface within the converter are received by the antenna 3 and mixed by the detector 12 with the reflected waves from the reference reflector 11 provided between the circulator 9 and the horn 10 thereby generating a beat signal. The frequency filter 13 connected to the output of the detector 12 detects only the beat signal which is then amplified by the amplifier circuit 14, converted into pulse waves by the waveform shaping circuit 15, and integrated for a predetermined length of time by the counter circuit 16. The result of each integrational counting operation, which is expressed as a voltage proportional to the distance between the antenna and the slag surface, is recorded by the recorder 17. The components used herein may be of those commonly used heretofore in the technical field of microwave radar.

Figure 4:
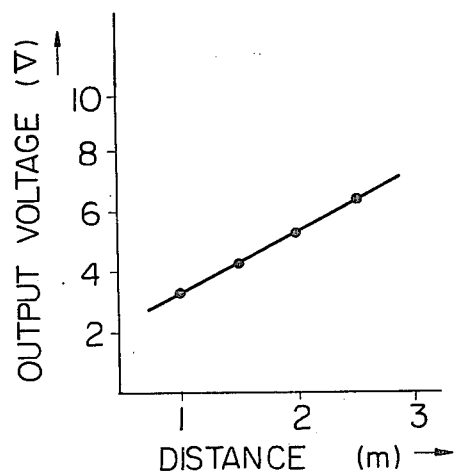
FIG. 4 is a graph showing the relationship between the distance from the antenna to the slag surface and the output voltage obtained in an embodiment of the apparatus according to the present invention.

FIG. 4 shows the relationship of the distance between the antenna and the slag surface to the output voltage of the counter circuit 16 of an example of the method according to the present invention in which the apparatus of the hereinabove construction and microwaves of X-band of 8–12.4 GHz are used.

Figure 5:
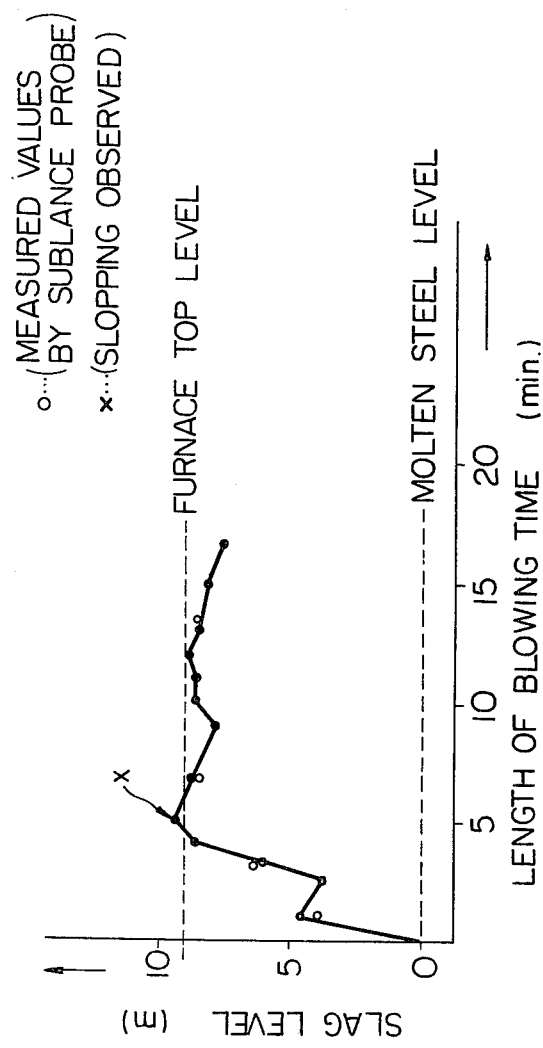
FIG. 5 is a graph showing the change with time of the slag level measured by an embodiment of the apparatus according to the present invention.

FIG. 5 shows the change with time of the slag surface level in a blowing operation measured in an example of this method and an embodiment of the apparatus according to the present invention. In this example, slopping was observed at the point X in the graph of FIG. 5. The results of a measurement using the sub-lance probe are shown for comparison.

As will be evident from the foregoing description, by use of the method and the apparatus according to the present invention it is possible to continuously and quantitatively determine the slag foaming level, to predict the possibility of slopping and therefore to prevent slopping by regulating the blowing condition in relation to the quantitatively measured slag foaming condition, thereby improving the control of the entire converter opertion.

What is claimed is:

1. A method for measuring the slag foaming level within a converter during a blowing operation, said method comprising the steps of:
   generating frequency modulated microwaves having a predetermined frequency change rate;
   emitting said microwaves toward a slag foaming surface within a converter;
   providing a reference reflector in the path of said emitted microwaves at a position a predetermined distance from the point of emission of said microwaves;
   reflecting a first portion of said microwaves from said reference reflector;
   reflecting a second portion of said microwaves from the slag foaming surface;
   receiving and mixing said first portion of microwaves reflected from said reference reflector and said second portion of said microwaves reflected from the slag foaming surface, thereby producing a beat signal;
   detecting said beat signal;
   determining a distance between the slag foaming surface and said reference reflector from said detected beat signal, thereby providing a measure of the slag foaming level.

2. A method as claimed in claim 1, wherein said step of generating frequency modulated microwaves comprises the steps of:
   generating microwaves having a fixed frequency; and
   frequency modulating said microwaves according to a saw-tooth waveform.

3. A method as claimed in claim 1, wherein said step of generating frequency modulated microwaves comprises the steps of:
   generating microwaves having a fixed frequency; and
   frequency modulating said microwaves according to a triangular waveform.

4. A method as claimed in claim 1, wherein said step of determining the distance between the slag foaming surface and said reference reflector comprises the steps of:
   (a) determining the frequency of said detected beat signal; and
   (b) calculating a value proportional to the distance between the slag foaming surface and said reference reflector by multiplying the determined frequency by a predetermined constant.

5. A method as claimed in claim 4, wherein said step of generating frequency modulated microwaves comprises the steps of:
generating microwaves having a fixed frequency; and
frequency modulating said microwaves according to a saw-tooth waveform.

6. A method as claimed in claim 4, wherein said step of generating frequency modulated microwaves comprises the steps of:
generating microwaves having a fixed frequency; and
frequency modulating said microwaves according to a triangular waveform.

7. A method as claimed in claim 1, wherein:
said emitting step comprises feeding said microwaves to an antenna for emission of said microwaves; and
said method further comprises the step of air purging said antenna for preventing the penetration of dust into said antenna.

8. A method as claimed in claim 1, wherein:
said emitting step comprises feeding said microwaves to an antenna for emission of said microwaves; and
said method further comprsises the step of water cooling said antenna for preventing heat from the converter from adversely affecting said antenna.

9. A method as claimed in claim 7, wherein:
said emitting step comprises feeding said microwaves to an antenna for emission of said microwaves; and
said method further comprises the step of water cooling said antenna for preventing heat from the converter from adversely affecting said antenna.

10. An apparatus for measuring the slag foaming level in a converter during a blowing operation, said apparatus comprising:
a microwave generator for generating frequency modulated microwaves having a predetermined frequency change rate;
an antenna connected to said microwave generator for emitting said microwaves and for receiving reflected microwaves, said antenna including a waveguide having a reference reflector for reflecting microwaves, and an electromagnetic horn adapted to be directed toward a slag foaming surface within a converter for reflecting a first portion of said microwaves from said reference reflector and for reflecting a second portion of said microwaves from the slag foaming surface; and
a signal processor connected to said antenna for processing said reflected microwaves received by said antenna for determining a distance from said antenna to the slag foaming surface, thereby providing a measure of the slag foaming level.

11. An apparatus as claimed in claim 10, wherein said antenna further comprises:
a protective tube in an extreme portion of said electromagnetic horn having an air purger for preventing penetration of dust from the converter into said antenna.

12. An apparatus as claimed in claim 10, wherein said antenna further comprises:
a water cooling means for preventing heat from the converter from adversely affecting said antenna.

13. An apparatus as claimed in claim 11 wherein said antenna further comprises:
a water cooling means for preventing heat from the converter from adversely affecting said antenna.

14. An apparatus as claimed in claim 10 wherein:
said antenna further comprises a microwave circulator for mixing microwaves reflected from the slag foaming surface and microwaves reflected from said reference reflector, thereby producing a beat signal; and
said signal processor comprises means for processing said beat signal for determining the distance from said antenna to the slag foaming surface.

15. An apparatus as claimed in claim 14 wherein said signal processor comprises:
a frequency filter connected to said microwave circulator for producing a detected beat signal;
an amplifier circuit connected to said frequency filter for amplifying said detected beat signal;
a waveform shaping circuit connected to said amplifier circuit for producing a pulse signal having a pulse frequency proportional to the frequency of said detected beat signal; and
a counter circuit connected to said waveform shaping circuit for counting said pulse signal for a predetermined period of time and for providing an output signal proportional to the frequency of said pulse signal.

16. An apparatus for measuring the slag foaming level in a converter during a blowing operation, said apparatus comprising:
a microwave generator for generating frequency modulated microwaves having a predetermined frequency change rate;
an antenna connected to said microwave generator adapted for emitting said microwaves toward a slag foaming surface within a converter and for receiving reflected microwaves, said antenna including a protecting tube in an extreme portion thereof having an air purger for preventing penetration of dust from the converter into said antenna; and
a signal processor connected to said antenna for processing said reflected microwaves received by said antenna for determining a distance from said antenna to the slag foaming surface, thereby providing a measure of the slag foaming level.

17. An apparatus as claimed in claim 16 wherein said antenna further comprises:
a water cooling means for preventing heat from the converter from adversely affecting said antenna.

18. An apparatus for measuring the slag foaming level in a converter during a blowing operation, said apparatus comprising:
a microwave generator for generating frequency modulated microwaves having a predetermined frequency change rate;
an antenna connected to said microwave generator adapted for emitting said microwaves toward a slag foaming surface within a converter and for receiving reflected microwaves, said antenna including a water cooling means for preventing heat from the converter from adversely affecting said antenna; and
a signal processor connected to said antenna for processing said reflected microwaves received by said antenna for determining a distance from said antenna to the slag foaming surface, thereby providing a measure of the slag foaming level.

* * * * *